United States Patent
Song et al.

(10) Patent No.: US 7,822,343 B2
(45) Date of Patent: Oct. 26, 2010

(54) TRANSPORT FRAME ARCHITECTURE FOR MULTI-RATE SERVICE, MULTIPLEXING APPARATUS FOR PROCESSING THE TRANSPORT FRAME AND METHOD FOR TRANSMITTING IT

(75) Inventors: Jong-tae Song, Daejeon (KR); Tae-joon Park, Daejeon (KR); Young-sik Chung, Daejeon (KR); Seong-soon Joo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 506 days.

(21) Appl. No.: 11/792,572

(22) PCT Filed: Dec. 6, 2005

(86) PCT No.: PCT/KR2005/004141

§ 371 (c)(1),
(2), (4) Date: Jun. 7, 2007

(87) PCT Pub. No.: WO2006/062326

PCT Pub. Date: Jun. 15, 2006

(65) Prior Publication Data

US 2008/0089683 A1    Apr. 17, 2008

(30) Foreign Application Priority Data

Dec. 8, 2004   (KR) ................. 10-2004-0103092
Oct. 20, 2005  (KR) ................. 10-2005-0099101

(51) Int. Cl.
  *H04B 10/20* (2006.01)
(52) U.S. Cl. .................. 398/58; 398/69; 370/395.51
(58) Field of Classification Search ............. 398/43, 398/45, 46, 58, 69, 74, 115, 116; 370/351, 370/389, 395.1, 395.5, 395.51
See application file for complete search history.

(56) References Cited

U.S. PATENT DOCUMENTS 6,134,238 A    10/2000    Noh (Continued)

FOREIGN PATENT DOCUMENTS

KR    1019990059021 A1    7/1999
KR    1019990062495 A1    7/1999

OTHER PUBLICATIONS

Notification Concerning Transmittal of International Preliminary Report for International Application No. PCT/KR2005/004141, Jun. 13, 2007.

*Primary Examiner*—Chi H Pham
*Assistant Examiner*—Weibin Huang
(74) *Attorney, Agent, or Firm*—Lahive & Cockfield, LLP; EuiHoon Lee, Esq.

(57) ABSTRACT

The present research relates to s a transmission frame structure supporting a data service and a circuit service of diverse bands in a Synchronous Optical Network (SONET)/Synchronous Digital Hierarchy (SDH) network. This research provides a transmission frame structure including a sync period, an async period, and a control period and provides a multiplexing apparatus that can add or extract a fixed length frame in the synch period of the transmission frame and add or extract a variable length frame in the asynch period, and a method for transmitting the transmission frame. The transmission frame structure includes a sync period for transmitting a fixed length frame; an async period for transmitting a variable length frame; and a control period for transmitting a control frame storing information for discriminating between the sync period and the async period. The technology of this research can be applied to a synchronous optical network system.

14 Claims, 5 Drawing Sheets

U.S. PATENT DOCUMENTS

| | | |
|---|---|---|
| 6,188,692 B1 | 2/2001 | Huscroft et al. |
| 6,349,101 B1 | 2/2002 | Yamashita et al. |
| 6,501,758 B1 | 12/2002 | Chen et al. |
| 6,668,297 B1 | 12/2003 | Karr et al. |
| 6,778,561 B1 | 8/2004 | Jha |
| 7,162,155 B2 * | 1/2007 | Handelman .................. 398/51 |
| 7,353,071 B2 * | 4/2008 | Blackwell et al. ............. 700/23 |
| 2002/0067529 A1 * | 6/2002 | Yokomoto et al. .......... 359/168 |
| 2004/0246977 A1 * | 12/2004 | Dove et al. ............. 370/395.61 |

* cited by examiner (a) SASX
Static Aggregation Static Extraction (c) DASX
Dynamic Aggregation Static Extraction (b) SADX
Static Aggregation Dynamic Extraction (d) DADX
Dynamic Aggregation Dynamic Extraction Packet Switch SONET/SDH Switch SONET/SDH Interface Packet Interface → Flow of SONET/SDH Data --→ Flow of Packet Data ○ Packet added to SONET/SDH Frame

TRANSPORT FRAME ARCHITECTURE FOR MULTI-RATE SERVICE, MULTIPLEXING APPARATUS FOR PROCESSING THE TRANSPORT FRAME AND METHOD FOR TRANSMITTING IT

RELATED APPLICATIONS

This application is a 35 U.S.C. 371 national stage filing of International Application No. PCT/KR2005/004141, filed 6 Dec. 2005, which claims priority to Korean Patent Application No. 2005-99101, filed on 20 Oct. 2005 in Korea, which claims priority to Korean Patent Application No. 2004-103092, filed on 8 Dec. 2004 in Korea. The contents of the aforementioned applications are hereby incorporated by reference.

DESCRIPTION

1. Technical Field

The present invention relates to a Synchronous Optical Network (SONET)/ Synchronous Digital Hierarchy (SDH); and, more particularly, to a transport frame structure supporting circuit services of diverse bands and data services, a multiplexing apparatus for processing the transport frame, and a method for transmitting the transport frame.

2. Background Art

At present, the Synchronous Optical Network (SONET)/Synchronous Digital Hierarchy (SDH) transmits signals used for circuit switching of speech signals to a high order path or a low order path. In the low order path, electrical signals of conventional speech signal transmission networks T1, E1 and DS3 are multiplexed into optical signals and transmitted, whereas the electrical signals multiplexed into 50 Mbps-unit synchronous transport signals (STSs) in the low order path are transformed into optical signals and transmitted in the high order path.

The SONET/SDH network is already used in most backbone networks. Recently, researchers are studying to develop the SONET/SDH network to support a packet transmission service to satisfy the increasing demand caused by the explosive propagation of the Internet.

Particularly, in an effort to transmit Ethernet data which occupy a major part of packet transmission through the SONET/SDH network, suggested are Transparent Mapped Generic Frame Protocol (GFP-T) and a Frame Mapped Fenderic Frame Protocol (GFP-F).

According to the GFP-F, variable length frames received in a subscriber end are transmitted by using GFP frames and one GFP frame has one variable length frame. Thus, to support the GFP-F, frames of a subscriber should be received and the data parts of the frames should be transmitted loaded on GFP frames. Also, a function of Media Access Control (MAC) is needed to extract frames of the subscriber end from the received GFP frames. Also needed is a multicast function for multicasting one frame to a plurality of transmission ends.

According to the GFP-F, signals of a subscriber transmission end are transformed regardless of frames and transmitted. Since the transmission end need not identify the frames of the signal transmitted from the subscriber, the transmission end can continue to transmit the signals with no regard to the size of a frame. Thus, it does not require the MAC function for identifying the frames of the subscriber end. However, since the physical port signals of the subscriber are transformed in the GFP-F, the band of the transmission network should be made equal to or wider than that of the port. In addition, all frames transmitted as described above should stop at the same node.

As described above, with the GFP-T or GFP-F, conventional data transmission through the Ethernet is carried out on the SONET/SDH network. The GFP-T or GFP-F changes the transmission structure of a data network into that of the SONET/SDH network. The data network transmission structure is switched to a path to the SONET/SDH network having a capacity equal to or larger than the band of data ports mainly to support the transmission capacity of physical ports.

When the band of the physical ports of the data ports is switched to the path to the SONET/SDH network, the available bands of the SONET/SDH network path are integer-fold bands of about 50 Mbps in case of signals transmitted through a high order path, integer-fold bands of about 1.5 Mbps or 2 Mbps in case of a low order path. The other bands are not available herein.

Since only bands of integer-folds of about 50 Mbps are available for services requiring a band higher than 50 Mbps, if a user requests a band of 60 Mbps, a band of 100 Mbps should be allocated to the user, which is inefficient. Therefore, a transmission network that can provide bandwidths more flexibly than the conventional SONET/SDH network is called for in order to satisfy the demand for diverse service bandwidths to be provided in future integrated networks.

However, it is quite burdensome to existing users to eliminate the SONET/SDH networks which occupy most of existing transmission networks and build up new transmission networks. Therefore, a transmission structure and a transmission method that can satisfy diverse future demands while operatable on the existing SONET/SDH networks are required.

DISCLOSURE

Technical Problem

It is, therefore, an object of the present invention to provide a transmission frame structure that includes a control period, a sync period, and an async period and supports diverse bands of circuits and data services in existing SONET/SDH networks.

It is another object of the present invention to provide a multiplexing apparatus that can add or extract a fixed length frame in the synch period of the transmission frame and add or extract a variable length frame in the async period.

It is another object of the present invention to provide a transmission frame transmitting method for transmitting the transmission frame by adding or extracting a fixed length frame in the synch period of the transmission frame and adding or extracting a variable length frame in the async period.

The other objects and advantages of the present invention can be understood by the following description and become apparent with reference to preferred embodiments of the present invention. Also, the objects and advantages of the present invention can be realized by the means as claimed and combinations thereof.

Technical Solution

In accordance with one aspect of the present invention, there is provided a transmission frame structure supporting a data service and a circuit service of diverse bands in a Synchronous Optical Network (SONET)/Synchronous Digital Hierarchy (SDH) network, which includes: a sync period for transmitting a fixed length frame; an async period for transmitting a variable length frame; and a control period for transmitting a control frame storing information for discriminating between the sync period and the async period.

In accordance with another aspect of the present invention, there is provided a multiplexing apparatus for processing a transmission frame supporting a data service and a circuit service of diverse bands in a SONET/SDH network, which includes: an overhead processor for receiving a SONET/SDH signal transmitted by being loaded on the transmission frame and checking whether there is an error in the transmission frame based on overhead information of the received SONET/SDH signal; a frame adder for disposing a fixed length frame transmitted from a subscriber end in a predetermined position in a sync period of the transmission frame when the transmission frame is normal; and a multiplexer for combining the normal transmission frame with the frame disposed by the frame adder, wherein the transmission frame includes: the sync period for transmitting the fixed length frame; an async period for transmitting a variable length frame; and a control period for transmitting a control frame storing information for discriminating between the sync period and the async period.

In accordance with another aspect of the present invention, there is provided a method for transmitting a transmission frame in a SONET/SDH network, which includes the steps of: a) receiving a SONET/SDH signal transmitted by being loaded on the transmission frame and checking whether there is an error in the transmission frame based on overhead information of the received SONET/SDH signal; b) disposing a fixed length frame transmitted from a subscriber end in a predetermined position in a sync period of the transmission frame when the transmission frame is normal; and c) combining the normal transmission frame with the disposed frame, wherein the transmission frame includes: the sync period for transmitting the fixed length frame; an async period for transmitting a variable length frame; and a control period for transmitting a control frame storing information for discriminating between the sync period and the async period.

Advantageous Effects

The technology of the present invention can support diverse bands flexibly because it can provide a wider range of bandwidths than conventional SONET/SDH networks which provide integer-fold bands of about 50 Mbps or 1.5 Mbps, while it is still based on the SONET/SDH networks.

Also, the technology of the present invention can support diverse services including speech and data by providing a basis for transmitting a service requesting a predetermined band such as a speech data transmission service and for providing a service requesting a variable band such as a data transmission service.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter. Accordingly, the technological concept of the present invention will be easily implemented by those skilled in the art of the present invention. Also, when it is considered that detailed description on prior art may blur the points of the present invention, the description will not be provided herein. Hereinafter, preferred embodiments of the present invention will be described in detail.

Figure 1:
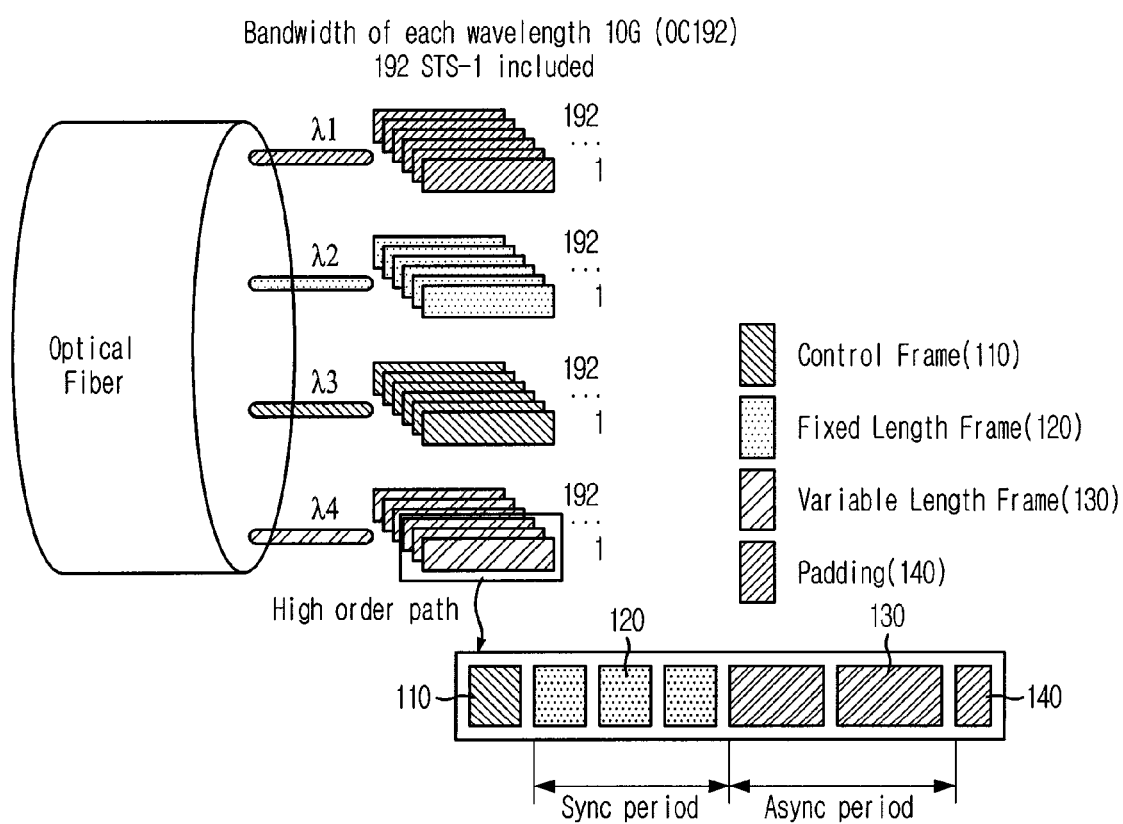
FIG. 1 is a diagram illustrating a structure of a transmission frame in accordance with the present invention.

FIG. 1 is a diagram illustrating a structure of a transmission frame in accordance with the present invention. Hereinafter, the transmission frame suggested in the present invention will be referred to as a universal Synchronous Optical Network (SONET).

Generally, one wavelength forms one optical channel in a Wavelength Division Multiplex (WDM) and one optical channel forms a predetermined number of high order paths in a SONET/Synchronous Digital Hierarchy (SDH).

For example, a 10 G optical channel forms a high order path of 192 STS-1, 64 STS-3c, 16 STS-12c, 4 STS-48c, one STS-192c, or a combination thereof. Herein, one STS-1 high order path transmits 810 bytes in every 125 us. One STS-nc transmits n*810 bytes in every 125 us proportionally, where STC-nc is formed of n STS frames. A uSONET frame is transmitted through a payload of the high order path. Since a low order path is not used, the overhead part of the low order path can be all used as the payload.

Meanwhile, as illustrated in FIG. 1, a starting part of the uSONET frame is a control frame 110 and it stores information for generally controlling the uSONET frame. Also, the control frame 110 includes information for identifying a sync period and an async period within the uSONET frame. In other words, since the control frame 110 includes information on a frame structure, it is possible to find out a payload of the high order path and logically acquire the positions of other periods based on the control frame 110 of a predetermined position, instead of searching for a frame boundary as it used to in conventional technology.

The control frame 110 is followed by a sync period for transmitting a fixed length frame 120 and an async period for transmitting a variable length frame 130. The fixed frame 120 is generally used to support a service requesting a stable data transmission in a predetermined band, such as a speech data transmission service. Since the fixed length frame 120 occupies a predetermined position in the uSONET frame, which is different from the variable length frame 130, it can be switched by reading data in the predetermined position or registering the data in the position. The variable length frame 130 transmits packets of variable lengths. When the variable length of a packet is too long to be accommodated in the uSONET frame, the variable length packet is divided into a plurality of fragments. The rear part of the uSONET frame which is not used and left behind becomes a padding 140.

Figure 2:
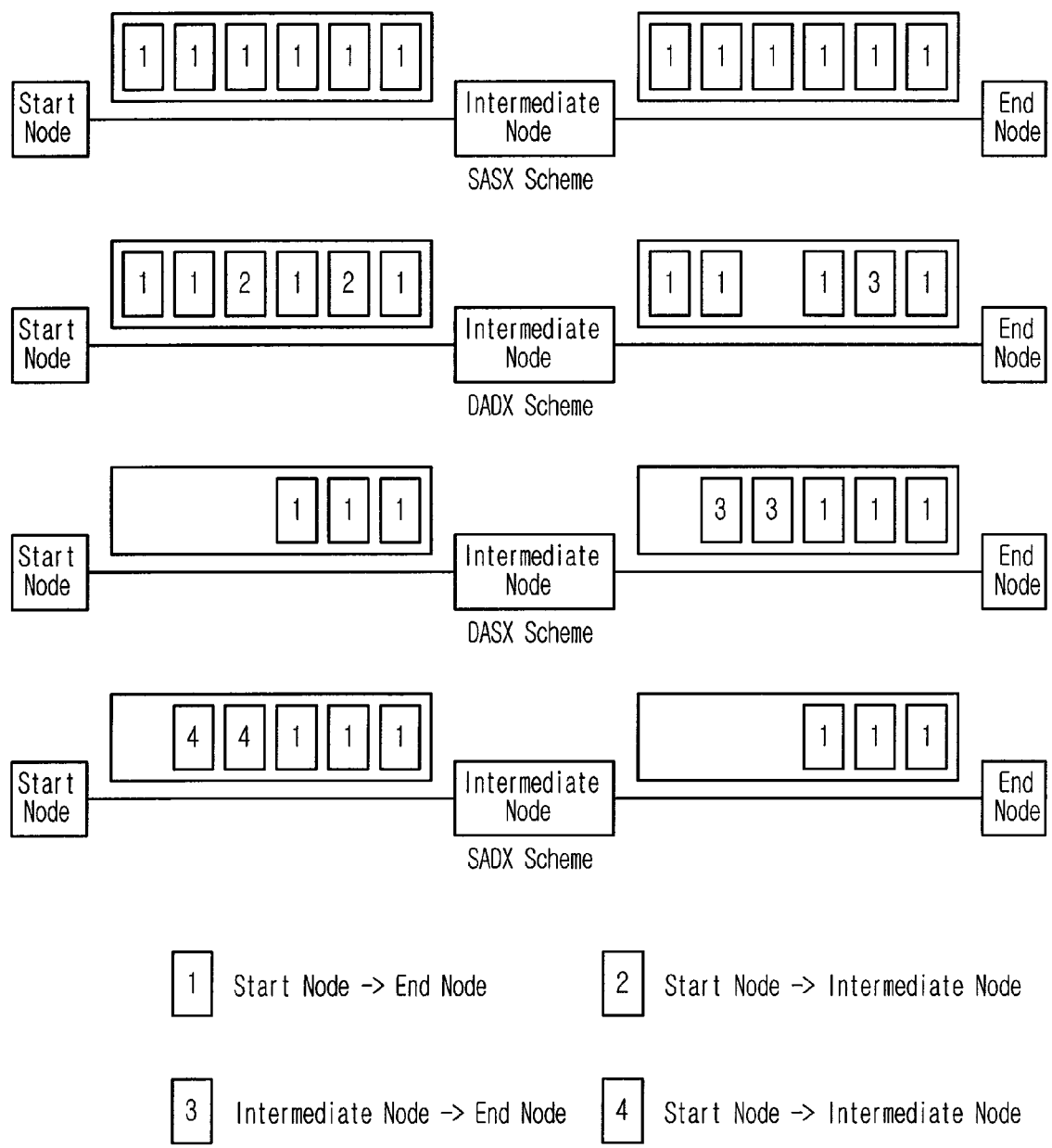
FIG. 2 is a diagram showing how a transmission frame is processed in nodes of a SONET/SDH network in accordance with an embodiment of the present invention.

FIG. 2 is a diagram showing how a transmission frame is processed in nodes of a SONET/SDH network in accordance with an embodiment of the present invention.

The transmission frame processing method for processing the transmission frame in the nodes of the SONET/SDH network includes four types according to a method of adding and extracting a fixed length frame to the sync period of the uSONET frame. In the present embodiments, the four types of transmission frame processing methods are defined as SASX Static Aggregation Static Extraction (SASX), DASX Dynamic Aggregation Static Extraction (DASX), SADX Static Aggregation Dynamic Extraction (SADX), and DADX Dynamic Aggregation Dynamic Extraction (DADX).

First, the SASX is a method where a uSONET frame formed in one sender node is transmitted to one destination node as it is. In other words, as shown in FIG. 2, when the sync period of the uSONET frame is formed of fixed length frames 1 in a starting node, the fixed length frames 1 of the sync period are directly transmitted to an end node.

The DASX is a method where a uSONET frame is formed in a plurality of nodes and transmitted to one destination node. In other words, as shown in FIG. 2, the fixed length frames 1 and 3 of a sync period of a uSONET frame are formed in a plurality of nodes including the starting node and an intermediate node and the completed fixed length frames 1 or 3 are all transmitted to the same end node.

The SADX is a method where all fixed length frames of a uSONET frame are formed in one sender node but transmitted to different destinations. In other words, as shown in FIG. 2, although the fixed length frames 1 and 4 of a uSONET frame are formed in one starting node, a part 4 of the fixed length frames is extracted in the intermediate node and transmitted to a subscriber end. Herein, the fixed length frames are extracted by multicasting the entire uSONET frame to subscriber ends in the intermediate node and the subscriber ends selectively take their own fixed length frames.

The DADX is the most flexible transmission method. According to the DADX, the fixed length frames of a uSONET frame are formed in a plurality of nodes including the sender node and the intermediate node, and then the completed fixed length frames of the sync period are transmitted to different destinations individually. In short, as described in FIG. 2, the fixed length frames 2 and 3 are added to the sync period of a uSONET frame regardless of the uSONET frame, extracted and then transmitted. Herein, the fixed length frames are extracted and the entire uSONET frame is multicasted to the subscriber ends in the intermediate node. Then, the subscriber ends take their own fixed length frames selectively.

The above-described four transmission methods have excellent scalability in proportion to their flexibility. For example, when N nodes are connected linearly to thereby form a network and the number of nodes in the network is N; the number of high order paths is S; and the number of fixed length frames included in a uSONET frame is F, the above transmission methods should satisfy the following equation 1 in order to connect all the N nodes:

$$S > \frac{N^2}{4} \quad SASX$$
$$S > N-1 \text{ and } F > N-1 \quad SADX \text{ \& } DASX$$
$$SF > \frac{N^2}{4} \quad DADX$$

Eq. 1

In a network connecting nodes linearly, the SASX and the DADX have the maximum circuit numbers per link of S and SF, respectively, and they require $N^2/4$ circuits in the central links. The SADX and the DASX have the maximum circuit number per link of S, individually, and they require N−1 circuits in the starting and terminating ends. Thus, when it is assumed that F is 20 in a network of OC48, that is a network where S=48, the SASX can connect 13 nodes and the SADX and the DASX connect 47 nodes while the DADX connects 61 nodes.

Figure 3:
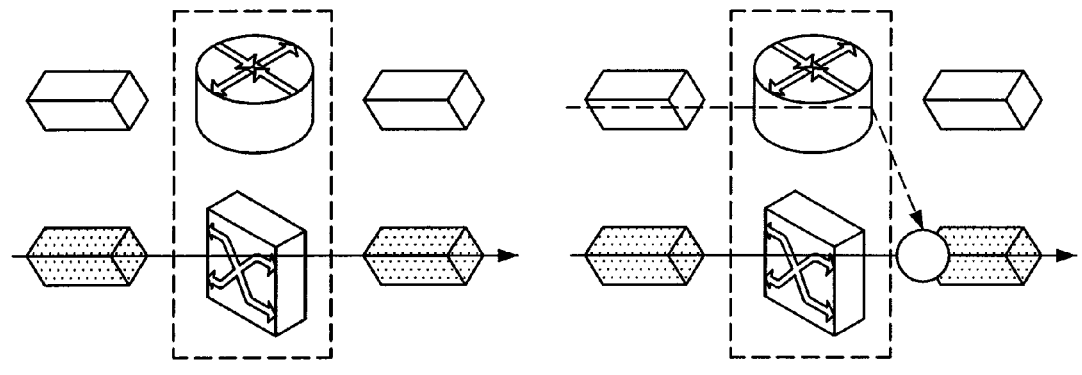
FIG. 3 is a diagram describing a structure of a transmission switch of an intermediate node for processing a transmission frame in accordance with an embodiment of the present invention.
Figure 3:
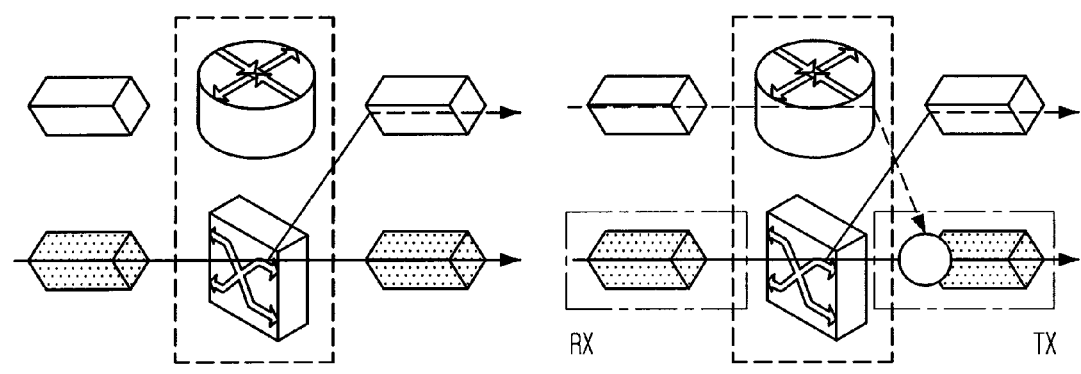
Figure 3:
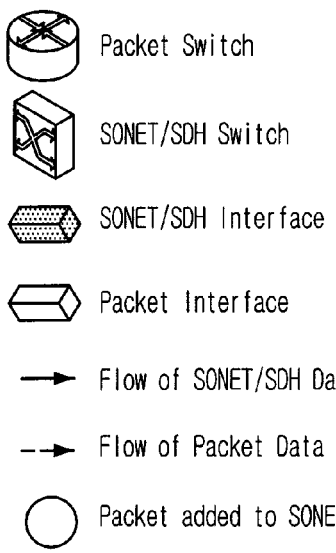

FIG. 3 describes a transmission switch of an intermediate node for processing a transmission frame in accordance with an embodiment of the present invention.

Referring to the (a) SASX of FIG. 3, the intermediate node switches a received uSONET frame and transmits it without any change. Referring to the (b) SADX of FIG. 3, the intermediate node extracts part of the fixed length frames of a uSONET frame and makes the rest of them pass through itself. Referring to the (c) DASX of FIG. 3, the intermediate node combines a new fixed length frame with an existing frame in the sync period of the received uSONET frame. Referring to the (d) DADX of FIG. 3, the intermediate node performs the functions of the SADX and the DASX.

In the extraction of the fixed length frame in the intermediate node, a switch module multicasts the entire uSONET frame to a transmission end and subscriber ends and the subscribers takes their own fixed length frame selectively. In short, the multicast function is provided in addition to the conventional high order path switching function. Beside, a function of multiplexing the switched frame and a fixed length frame received in a subscriber end is required to add a fixed length frame to the sync period.

Figure 4:
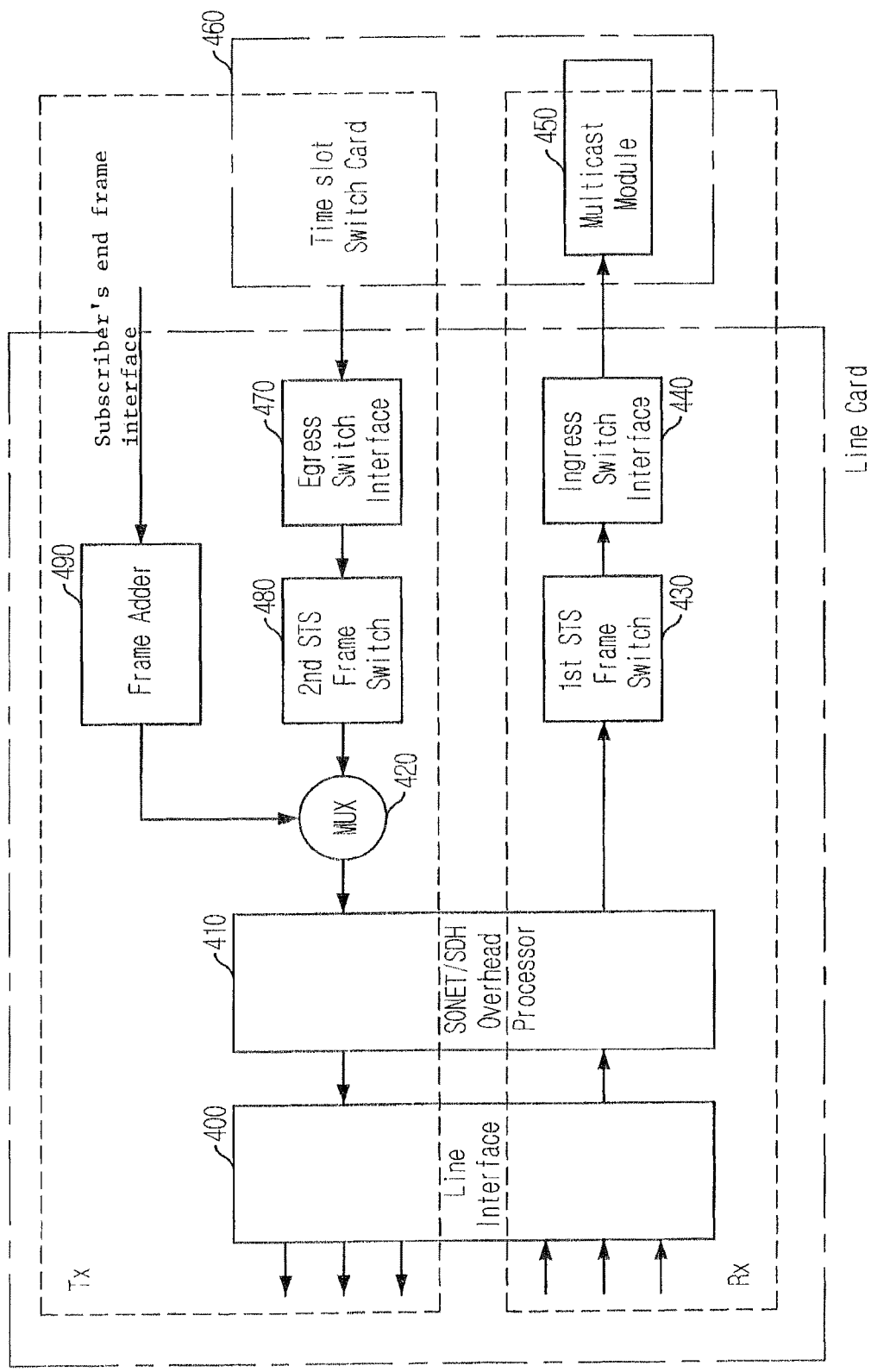
FIG. 4 is a block diagram illustrating the intermediate node of FIG. 3.

FIG. 4 shows a block diagram of the intermediate node shown in FIG. 3. The Rx and Tx marked with a dotted line corresponds to the Rx and Tx of FIG. 3 and they performs reception and transmission of a uSONET frame. The uSONET frame is transmitted through a payload of the high order path in the SONET/SDH network, and the high order path is formed of STS frames.

First, the operation of a reception end (Rx) will be described hereinafter.

A line interface 400 extracts a SONET/SDH signal from a signal transmitted from a reception line and transmits it to a SONET/SDH overhead processor 410. The SONET/SDH overhead processor 410 checks whether there is an error in the performance of received STS frames based on the overhead information of the received SONET/SDH signal, and if there is no error, the SONET/SDH overhead processor 410 transmits the STS frames to a $1^{st}$ STS frame switch 430.

The $1^{st}$ STS frame switch 430 rearranges the high order paths formed of the received STS frames and switches them to temporary high order paths of an intermediate step that can pass through a switch card 460. For example, when an input end includes four ports, an internal port having a four-fold bandwidth of the number of STS frames supported by each port is required between a line card and the switch card 460. The $1^{st}$ STS frame switch 430 switches the STS frames transmitted from the four ports to the four-fold multiplexed STS frames of the internal port and transmits them to an ingress switch interface 440.

The ingress switch interface 440 transforms the rearranged signals of the $1^{st}$ STS frame switch 430 into switch interface signals, e.g., T-Bus, to be transmitted to the switch card 460 and transmits them to the switch card 460. Then, the switch card 460 switches one input high order path to an output part of the line card. Herein, a multicast module 450 in the switch card 460 transmits input signals to a line card for one or more destinations.

Subsequently, the operation of a transmission end will be described hereinafter.

An egress switch interface 470 transforms a signal, e.g., T-Bus, transmitted from the switch card 460 into an STS frame signal and transmits the STS frame signal to a $2^{nd}$ STS frame switch 480. The $2^{nd}$ STS frame switch 480 transforms the received STS frame signal into a destination high order path of an output port and transmits it to a multiplexer 420.

Meanwhile, a client frame interface receives a fixed length frame from a subscriber end and transmits it to a frame adder 490. Herein, the position of the fixed length frame is determined in the sync period in a moment when a circuit service is established, and the fixed length frame position information is transmitted to the frame adder 490. The frame adder 490 transforms the information into a signal for adding the fixed length frame received from the subscriber end to a predetermined high order path position, disposes the fixed length frame in the determined position of the sync period and transmits the high order path with the fixed length frame to a multiplexer 420. In short, the control frame information does not need to be processed for each transmission frame.

The multiplexer 420 adds the fixed length frame of the subscriber end which is transmitted from the frame adder 490 to a predetermined position of the STS frame transmitted from the $2^{nd}$ STS frame switch 480 to thereby produce an STS frame and transmits the STS frame to the SONET/SDH overhead processor 410.

The SONET/SDH overhead processor 410 generates a SONET/SDH overhead for the new STS frame and transmits the SONET/SDH overhead to a line interface 400. The line interface 400 transforms the SONET/SDH overhead signal suitable for a line transmission medium and transmits it.

A method of adding and extracting a fixed length frame is described in the above. In case of a fixed length frame, the process is relatively simple because a fixed length frame is added to a predetermined part of a synch period periodically. In case of a variable length frame, however, the addition and extraction is complicated because the boundary between variable length frames is different for each uSONET frame. To solve this problem with the variable length frame, an async period control frame for controlling the state of variable length frames is needed in the async period of a uSONET frame.

Figure 5:
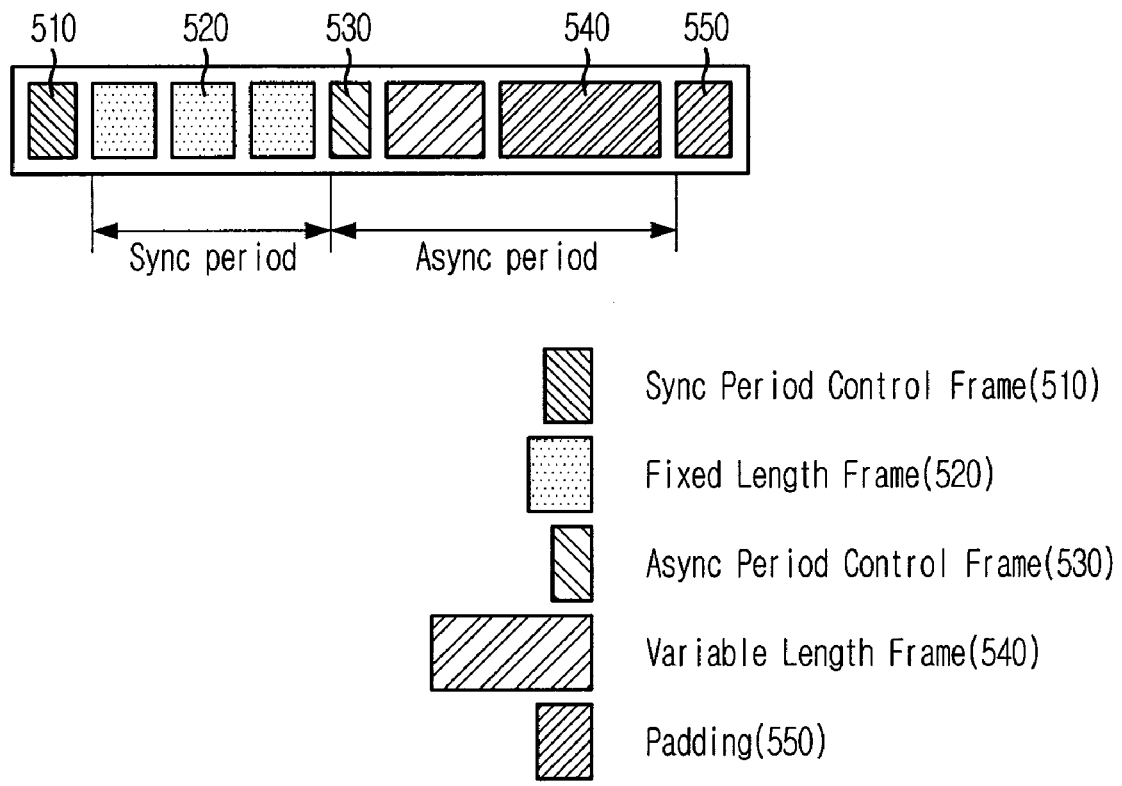
FIG. 5 is a diagram showing a structure of a transmission frame including an async period control frame in accordance with an embodiment of the present invention.

FIG. 5 is a diagram showing a structure of a transmission frame including an async period control frame in accordance with an embodiment of the present invention. The async period control frame 530 records usage information of an async period and it is updated whenever a variable length frame 540 is added or extracted in each node. Also, when the variable length frame 540 of a subscriber end is added, an available period is detected in advance based on the async period control frame information.

The subscriber frame interface of FIG. 4 receives the variable length frame 540 from the subscriber end and transmits it to the frame adder 490. The frame adder 490 finds out a starting point of the async period based on the sync period control frame information 510 and finds out the async period control frame 530 in the initial part of the async period. Then, the frame adder 490 figures out an available space of the async section by analyzing the async period control frame information 530. The variable length frame 540 is disposed in the available space of the async period, which was figured out in the above, and updated async period usage information is recorded in the async period control frame 530. Then, the multiplexer 420 combines the variable length frame 540 of the subscriber end with the STS frame transmitted from the $2^{nd}$ STS frame switch 480 and transmits it to the SONET/SDH overhead processor 410.

The method of the present invention described above can be realized as a program and stored in a computer-readable recording medium, such as a CD-ROM, RAM, ROM, floppy disk, hard disk, magneto-optical disk and the like. Since the process can be easily implemented by those skilled in the art of the present invention, detailed description on it will not be provided herein.

While the present invention has been described with respect to certain preferred embodiments, it will be apparent to those skilled in the art that various changes and modifications may be made without departing from the scope of the invention as defined in the following claims.

What is claimed is:

1. A non-transitory computer readable recording medium for storing a transmission frame structure supporting a data service and a circuit service of diverse bands in a Synchronous Optical Network (SONET) /Synchronous Digital Hierarchy (SDH) network, comprising:
    a sync period for transmitting a fixed length frame;
    an async period for transmitting a variable length frame; and
    a control period for transmitting a control frame storing information for discriminating between the sync period and the async period,
    wherein the transmission frame is transmitted through a payload of a high order path in the SONET/SDH network.

2. The transmission frame structure as recited in claim 1, wherein the async period includes a control period for transmitting a control frame storing state information of the variable length frame.

3. The transmission frame structure as recited in claim 1, wherein the control frame transmitted in the control period of the async period is updated whenever the variable length frame is added to and extracted from the async period.

4. The transmission frame structure as recited in claim 1, wherein a position where the fixed length frame is added in the sync period is determined in a moment when the circuit service is established.

5. A multiplexing apparatus for processing a transmission frame supporting a data service and a circuit service of diverse bands in a Synchronous Optical Network (SONET)/Synchronous Digital Hierarchy (SDH) network, comprising:
    an overhead processor for receiving a SONET/SDH signal transmitted by being loaded on the transmission frame and checking whether there is an error in the transmission frame based on overhead information of the received SONET/SDH signal;
    a frame adder for disposing a fixed length frame transmitted from a subscriber end in a predetermined position in a sync period of the transmission frame when the transmission frame is normal; and
    a multiplexer for combining the normal transmission frame with the frame disposed by the frame adder, wherein the transmission frame includes:
    the sync period for transmitting the fixed length frame;
    an async period for transmitting a variable length frame;
    and a control period for transmitting a control frame storing information for discriminating between the sync period and the async period.

6. The multiplexing apparatus as recited in claim 5, further comprising:
   a multicasting unit for multicasting the normal transmission frame to subscriber ends.

7. The multiplexing apparatus as recited in claim 5, wherein the async period includes a control period for transmitting a control frame storing state information of the variable length frame in the async period, and
   the frame adder figures out an available space in the async period by analyzing the control frame information of the async period and disposing the variable length frame transmitted from the subscriber end in the available space.

8. The multiplexing apparatus as recited in claim 7, wherein the frame adder updates the control frame of the async period after disposing the variable length frame in the async period.

9. The multiplexing apparatus as recited in claim 5, wherein the transmission frame is transmitted through a payload of a high order path in the SONET/SDH network.

10. A method for transmitting a transmission frame in a Synchronous Optical Network (SONET) /Synchronous Digital Hierarchy (SDH) network, comprising the steps of:
   a) receiving a SONET/SDH signal transmitted by being loaded on the transmission frame and checking whether there is an error in the transmission frame based on overhead information of the received SONET/SDH signal;
   b) disposing a fixed length frame transmitted from a subscriber end in a predetermined position in a sync period of the transmission frame when the transmission frame is normal; and
   c) combining the normal transmission frame with the disposed frame, wherein the transmission frame includes:
   the sync period for transmitting the fixed length frame;
   an async period for transmitting a variable length frame; and
   a control period for transmitting a control frame storing information for discriminating between the sync period and the async period.

11. The method as recited in claim 10, further comprising the step of:
   d) multicasting the transmission frame which is confirmed to be normal in the step a) to subscriber ends.

12. The method as recited in claim 10, wherein the async period includes a control period for transmitting a control frame storing state information of the variable length frame in the async period, and
   the method further includes the step of: e) figuring out an available space in the async period by analyzing the control frame information of the async period and disposing the variable length frame transmitted from the subscriber end in the available space.

13. The method as recited in claim 12, comprising the step of:
   f) updating the control frame of the async period after the variable length frame is disposed in the async period.

14. The method as recited in claim 10, wherein the transmission frame is transmitted through a payload of a high order path in the SONET/SDH network.

* * * * *